March 14, 1967    F. E. BELLAS ET AL    3,308,845

MOBILE SERVICE STATION UNIT

Filed April 14, 1964    3 Sheets-Sheet 1

INVENTORS
FREDERICK E. BELLAS
ROBERT A. DECKER

BY *Rupert J. Brady*
ATTORNEY

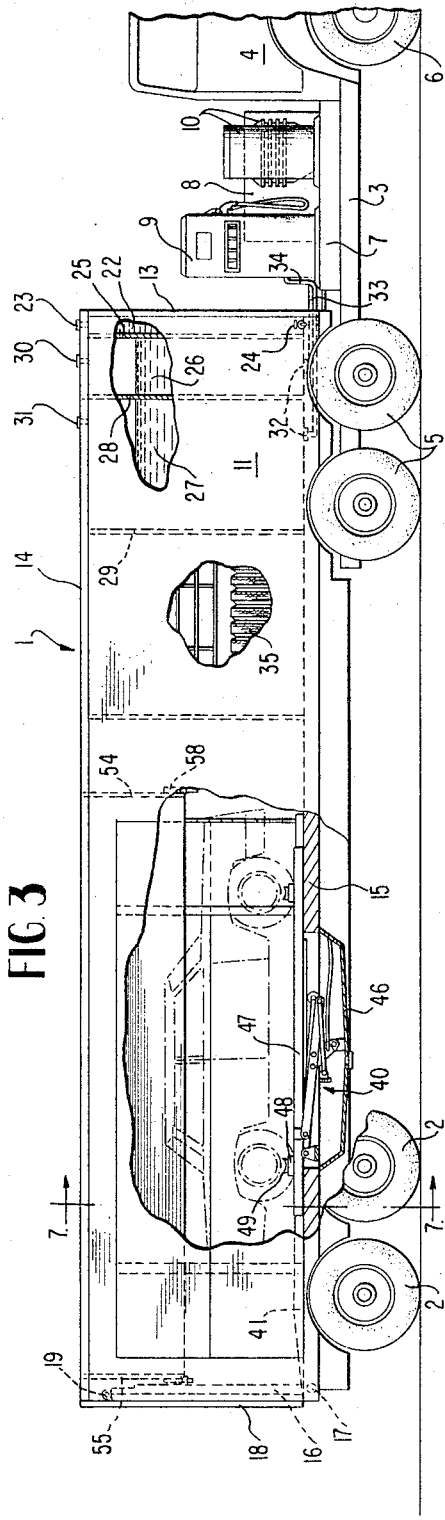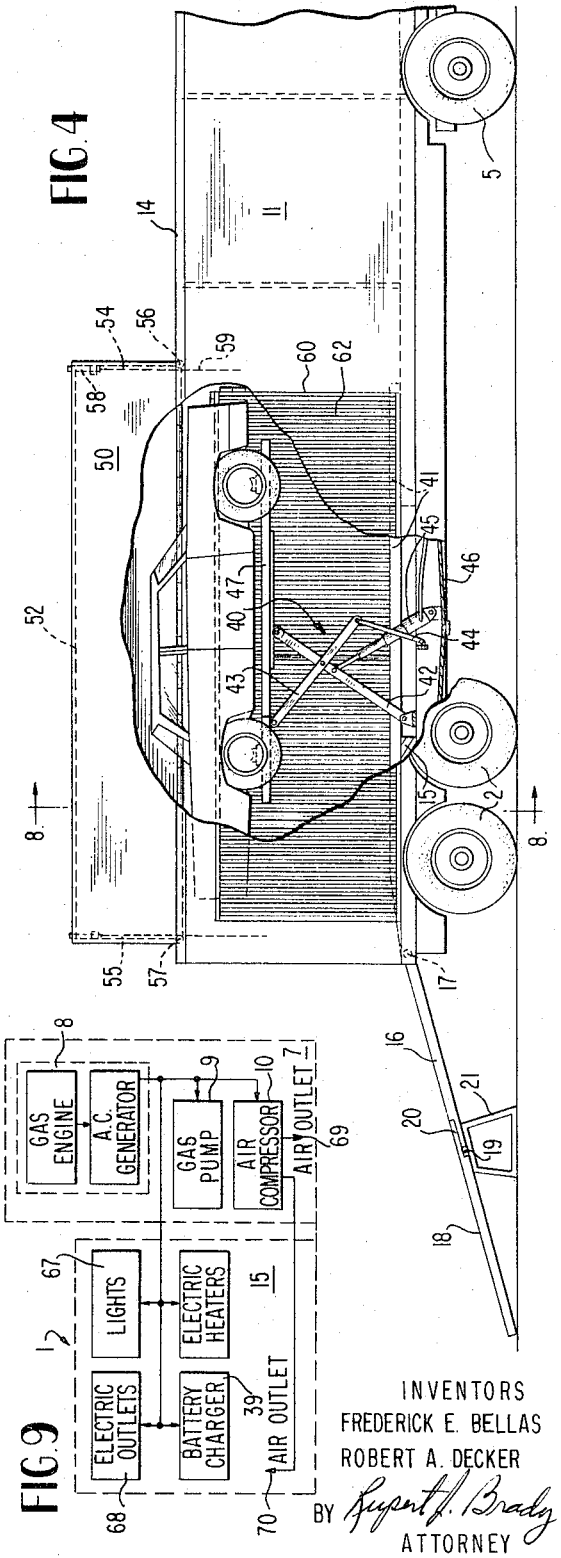

March 14, 1967 F. E. BELLAS ET AL 3,308,845
MOBILE SERVICE STATION UNIT
Filed April 14, 1964 3 Sheets-Sheet 3

INVENTORS
FREDERICK E. BELLAS
ROBERT A. DECKER
BY Rupert J. Brady
ATTORNEY

United States Patent Office 3,308,845
Patented Mar. 14, 1967

3,308,845
MOBILE SERVICE STATION UNIT
Frederick E. Bellas, 148 Zerby Ave., Edwardsville, Pa. 18704, and Robert A. Decker, 261 McLean St., Wilkes-Barre, Pa. 18702
Filed Apr. 14, 1964, Ser. No. 359,683
17 Claims. (Cl. 137—234.6)

This invention relates broadly to a mobile unit for servicing automobiles and the like, and more particularly to a mobile service station unit which can travel from place to place and provide all of the facilities of a stationary service station at any selective locale.

In order for the average automobile owner to have his car serviced he must either take several hours off from work, or have his car serviced at a service station over the weedend, when such service stations are usually very crowded and busy. This usually entails considerable loss of time to the automobile owner in working hours or leisure hours as in addition to the time it requires a service station or shop to repair the car, the automobile owner usually must wait quite some time before his car is reached in turn for servicing. As a result, most automobile owners do not service their cars as frequently as they should be, to keep them in proper operating condition, merely because of the annoying inconvenience which accompanies proper servicing. It is therefore the object of the present invention to provide a novel construction of mobile service station unit which can easily be transported and set up at any locale to service passenger automobiles and the like.

The mobile service station unit offers a practical method of time saving convenience and service to the public. The unit can be easily transported to various parking lots, industrial sites, Government parking sites, shopping centers, amusements parks, etc.; for instance the mobile service station unit could make regular scheduled rounds of city parking lots. An automobile owner, when parking his car in the morning on his way to work, would merely tell the parking lot attendant the service he wished performed on his automobile, and his car would be serviced at the parking lot by the mobile service station unit while he is at work. When he picks up his car at the parking lot it will have been fully serviced without requiring any substantial additional time or inconvenience to himself other than the time it normally requires him to leave and pick up his automobile at the parking lot.

The mobile service station unit of the present invention can offer the majority of services offered by a stationary service station, such as gasoline refueling, lubrication and oil change, State safety inspection service, and minor automobile repairs, including the replacing of such items as batteries, spark plugs, tires, windshield wiper blades, anti-freeze, etc. Due to the convenience offered by this unit, the automobile owner will have his automobile checked and serviced more frequently resulting in a greater number of cars in proper working condition. The unit will thus assist in increasing overall traffic safety by reducing the number of automobile accidents due to the lack of proper automobile maintenance, and servicing. The unit of the present invention will also aid in the creation of additional jobs for the labor force.

Another object of the present invention is to provide a construction of mobile service station unit which provides shelter for the automobile being serviced during inclement weather to render the unit operational during any type of weather.

Another further object of the invention is to provide a construction of mobile service station unit which provides means for sheltering an automobile within the unit even while the automobile is hoisted in the air for maintenance beneath the car.

Still another object of the invention is to provide a construction of mobile service station unit which enables an automobile to be completely enclosed within the unit with sufficient space on all sides of the automobile for carrying on maintenance procedures.

A further object of the invention is to provide a construction of mobile service station unit which carries a sufficient supply of water, fuel, oil, grease and replacement parts and supplies for fully servicing approximately 160 automobiles per day.

Still a further object of the invention is to provide a construction of mobile service station unit in which the body of the unit provides means cooperative with a hydraluic lift within the unit for maintaining an automobile hoisted on the lift completely enclosed within the unit while maintaining the dimensions of the unit in accordance with State regulations.

Other and further objects of the invention are set forth more fully in the specification hereinafter following by reference to the accompanying drawings, in which:

FIG. 2 is a perspective view similar to FIG. 1, but showing the unit of the invention disposed in a state for servicing automobiles or the like;

FIG. 3 is an enlarged partial side elevational view of the unit of FIG. 1, the view being broken away to show portions thereof in vertical section;

FIG. 4 is an enlarged partial side elevational view of the unit of FIG. 2, with portions broken away to disclose the interior of the unit;

FIG. 9 is a schematic block diagram of the power distribution system.

Figure 1:
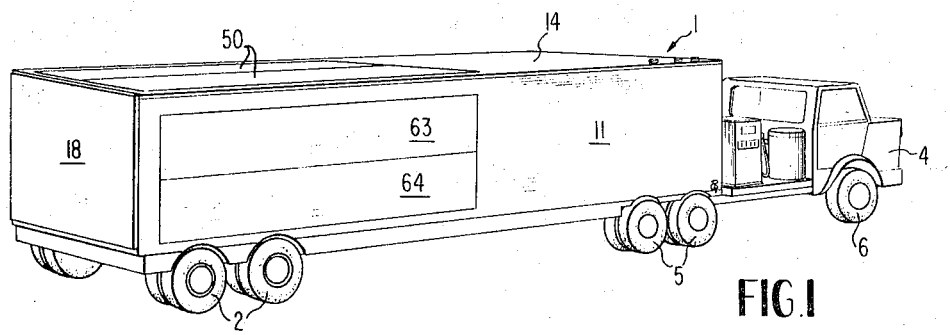
FIG. 1 is a perspective view of the mobile service station unit of the invention, and particularly showing the unit disposed in a state for transporting from place to place.

Referring to the drawings in greater detail, the mobile service station unit of the invention comprises a van body portion, indicated generally at 1, supported by the tandem wheeled rear axles 2 and connected by means of a fifth wheel coupling, not shown, in the usual manner, to the base structure 3 of cab 4 which is supported by the dual wheeled axles 5, beneath the fifth wheel connection and by front axles assembly 6 beneath the cab. The engine for powering the unit and driving axles 5 is included in cab 4 in the usual manner. With the van body portion 1 and cab 4 supported by the five axles in the manner shown, no difficulty is encountered with State regulations with regard to the total weight of the unit per axle.

However, it is to be understood that different arrangements of axles for supporting the unit can also be used without departing from the scope of the invention.

A platform 7 is provided on base structure 3 between cab 4 and van body portion 1, with the length of this platform being of the order of six feet. A gasoline motor generator unit, indicated at 8, is mounted on platform 7 for supplying A.C. power for the lighting, heating, pumping and air-compressing systems in the unit. The motor generator unit may consist of a gasoline engine of approximately 40-horsepower driving an A.C. generator having a rating of approximately 11.2 kilowatts. A gas pump 9 of the usual type, and an air compressor unit 10 are also mounted on platform 7 with motor generator unit 8 being connected thereto, as shown in FIG. 9 to supply electrical power to gas pump 9 and the motor of air compressor 10.

Figure 2:
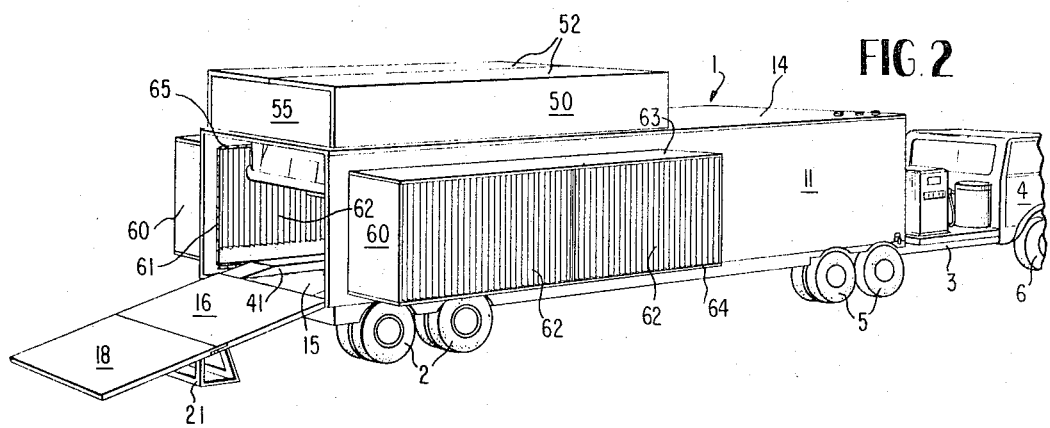

Van body portion 1 consists of side wall portions 11 and 12, front wall portion 13 and top wall portion 14, constructed on the base structure 15 which forms the floor and chassis of the van body portion to which the tandem wheeled rear axles 2 are connected. The side, front and top wall portions 11, 12, 13 and 14 are constructed in the usual manner with reinforcing beams and cross-ribbing sheathed with a thin layer of metal, such as aluminum, so that the walls are approximately three inches thick. The back portion of van body portion 1 is closed by a full width tailgate member 16 hinged at 17 to base structure 15. A second tailgate member 18 is hinged at 19 to the top portion of tailgate member 16, as shown in the folded position in FIGS. 1 and 3, so as to lie parallel with and in overlying relation with tailgate member 16, when folded to close the rear portion of the van. As shown in FIGS. 2 and 4, when the tailgate sections 16 and 18 are lowered, they are pivoted about hinge 19 to be disposed in end-to-end relation with their adjacent ends interfitting as indicated at 20 to form an auxiliary ramp from ground level to the inner floor of the van body portion formed by base structure 15. A support member 21, carried interior of the van body portion during transportation of the van, from place-to-place, may be slid under the tailgate hinge 19 to give the ramp additional support at this connection point. Support member 21 may be constructed of pipe sections or may be of lightweight beam construction.

The front portion of van body portion 1 provides tankage and storage sections for water, gasoline, and spare and replacement parts and supplies. A rectangular water tank compartment 22 having fill inlet 23 on the top wall portion of the van, and a gravity outlet, such as faucet 24 on the side wall 11 of the van, is constructed between front wall portion 13 and partition wall 25 so as to store approximately 320 gallons of clean water. The tank compartment is constructed of noncorrosive material and holds sufficient water to service an average of 160 cars in an eight hour day, based upon each car requiring approximately two gallons of water, with each car requiring approximately three minutes for servicing.

A pair of gasoline storage compartments 26 and 27, separated from each other by a partition wall 28 and from the remainder of the van by partition wall 29, are positioned behind water compartment 22 with the walls thereof being constructed in the usual manner to form leak-proof tanks. The gasoline storage compartments are provided with fill inlets 30 and 31, respectively, on top wall portion 14 and outlets 32 at the base of the compartments having valves thereon, not shown, which are connected through flexible hose 33 and 34 to gas pump 9 on platform 7 of the cab assembly. Gasoline storage compartments 26 and 27 provide overall storage for 3000 gallons of gasoline taking into account the volume expansion coefficient of gasoline. This should supply sufficient gasoline for servicing 160 cars per day with an average of approximately eighteen gallons of gasoline. If required, two fill inlets may be provided for each compartment in lieu of the single fill inlets 30 and 31 to aid in faster servicing of the mobile service station unit of the invention.

Gasoline storage compartment 26 may contain concentrated fuel, while storage compartment 27 may contain regular fuel. In this case gas pump 9 would be of the well-known blending type to blend various combinations of the fuels in compartments 26 and 27 supplied to the pump through flexible hose 33 and 34. If a blending type gas pump is not used then two individual gas pumps may be placed on platform 7 in lieu of the single gas pump 9 with flexible hose 33 and 34 each connected to an individual pump. With this arrangement, premium or high test type gasoline would be stored in compartment 26, while regular gasoline may be stored in compartment 27. The positioning of partition wall 28 to dictate the ratio of premium fuel to regular fuel in the overall 3000 gallons of stored gasoline would depend upon the sales ratio of regular versus premium gasoline in the locale where the mobile unit will operate and would preferably be positioned and constructed accordingly to the needs of each locale.

Figure 5:
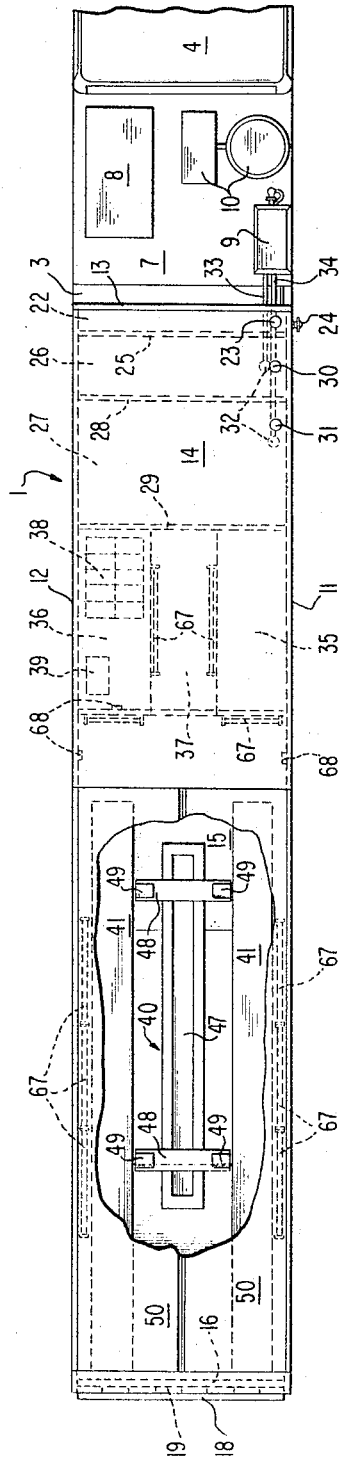
FIG. 5 is a top plan view of the unit of FIG. 3, showing the various partitioning of the unit in phantom, and having a roof portion broken away to disclose the positioning of the hydralic lift.
Figure 6:
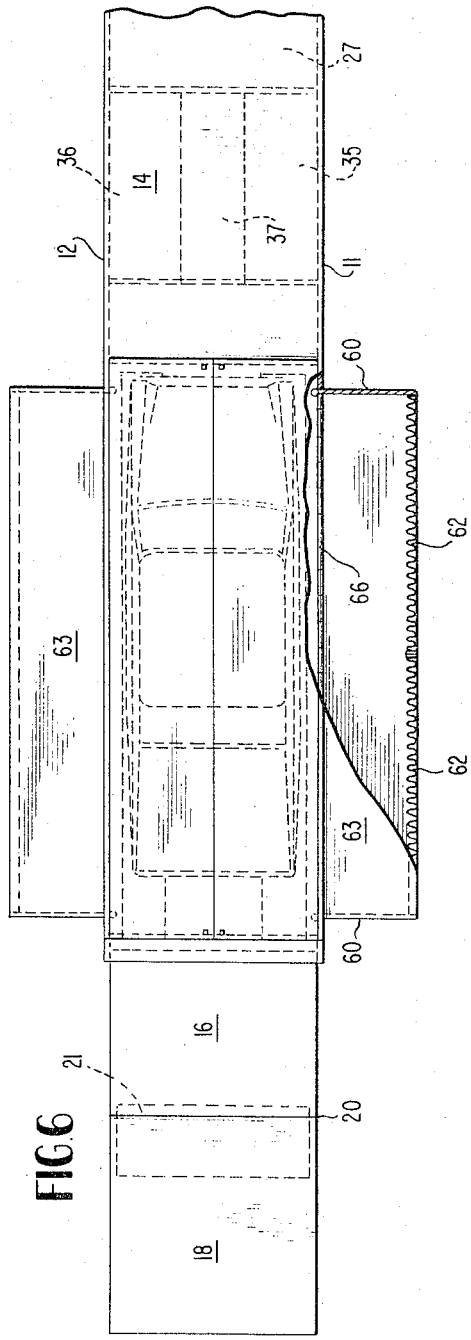
FIG. 6 is a top plan view of the unit of FIG. 4, showing one of the side extensible portions in fragmentary section.

A pair of longitudinally extending storage compartments 35 and 36 are disposed rearwardly of partition wall 29, along sidewalls 11 and 12, respectively, in parallel relation, separated by a walkway or passageway indicated at 37. These storage compartments are equipped to store maintenance tools, spare and replacement automobile parts and storage for refuse, such as oil drained from automobiles and the like. For instance, storage compartment 35 may be used to store new tires, spark plugs, wiper blades, anti-freeze, headlights, and other small replacement automobile parts, while storage compartment 36 may be used to store new batteries, lubricating grease and approximately 320 gallons of new oil for changing oil in the automobiles, based upon eight quarts of replacement oil for the average car. This compartment would also provide storage for a plurality of empty cans, indicated at 38, in FIG. 5, preferably five gallon cans of approximately sixty four in number, used for catching and storing the oil drained from cars and for storing the water drained from car radiators prior to filling with anti-freeze mixtures. These cans would later be emptied at the end of the day. This storage compartment may also provide bench space with a battery charger 39 for charging run-down storage batteries. The shelving and cabinets provided in storage compartments 35 and 36 are of optional design, depending largely upon the space requirements of the items stored therein.

The remaining portion of van body portion 1 from the storage compartments back to the tailgate provides space for a hydraulic automobile lift, indicated generally at 40, onto which an automobile may be driven and raised for servicing. This compartment, which is approximately twenty-five feet in length, provides sufficient space for performing all necessary repair and maintenance on the average car. A pair of stationary, longitudinally extending tracks 41 are provided adjacent opposite side wall portions of the vehicle in this maintenance area so that when tailgate sections 16 and 18 are unfolded to form a ramp as shown in FIGS. 2 and 4, an automobile may be driven up the ramp and onto stationary tracks 41, interior of the vehicle.

Figure 8:
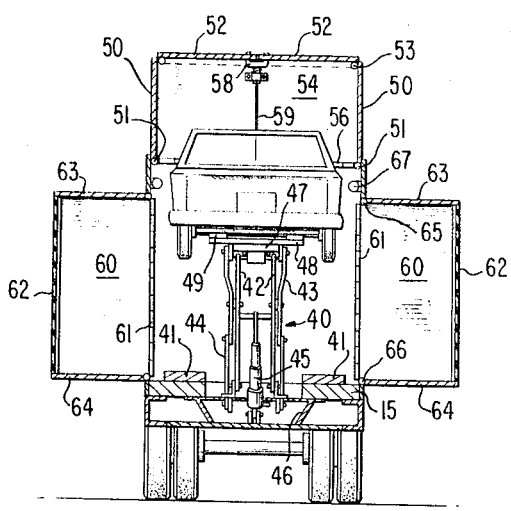
FIG. 8 is a cross-sectional view taken substantially along line 8—8 of FIG. 4.

The hydraulic automobile lift 40, comprising the pivotally connected lever arm assemblies 42, 43 and 44, actuated by the telescoping hydraulic cylinder 45, is connected between stationary tracks 41, substantially centrally of the maintenance section of the van, in a recess in base structure 15 as shown more particularly in FIGS. 3, 4 and 8. The bottom portion of the recess on which the hydraulic cylinder is supported forms a clean-out drain pan 46 having a central drain plug for draining grease and other matter which may accumulate therein. The drain pan recess in the floor base structure of the vehicle enables the hydraulic lift members to be retracted beneath the floor level so that the H-frame 47, raised by the hydraulic lift, is disposed between stationary tracks 41 and at the same level therewith in the retracted position. H-frame member 47 includes the cross-plates 48 which are shiftable longitudinally thereon in the usual manner to fit automobiles of different wheel bases, and each cross-piece 48 includes a pair of axle-engaging members 49, shiftable laterally with respect to each other on each cross-piece 48 to properly engage the axles of vehicles of different widths in the usual manner. In FIG. 3, the hydraulic lift mechanism is shown in the fully retracted position, while in FIGS. 4 and 8 the lift is shown in the raised position with an automobile thereon.

The hydraulic lift or hoist utilized in the van body portion may be any of the well-known designs presently supplied by such companies as Marion Metal Products Company, of Marion, Ohio; Moore Body Company, of Reading, Pa.; or Converto Manufacturing Co., Inc., of Cambridge City, Ind., and the hydraulic lift disclosed herein is shown only for purposes of illustration, as many different types of telescoping hydraulic lifts can perform the same job as that disclosed herein. The lift must have the capability to lift two-to-three tons to provide a safety factor on a 4500 to 5000 lb. automobile, and must be capable of lifting the car vertically to a height of approximately six feet so that a mechanic can work comfortably beneath the car. In the lift shown herein at 40, the actuating mechanism is located substantially centrally of the car body to allow sufficient room for the mechanic to work around the sides of the car, and the H-frame 47 is maintained at all times during the lifting operation in a horizontal position as lever arm assembly 43 is pivoted to one end thereof, while the end of lever arm assembly 42 is disposed in sliding relation therewith.

The hydraulic cylinder 45 is connected by means of a hydraulic hose to a hydraulic pump, not shown, mounted in cab 4 in the usual manner, and controlled from the cab. Cabs are commonly supplied with hydraulic pumps for operating hydraulic tailgates and the like and a similar type pump is utilized to operate the present hydraulic lift. A remote control situated in the maintenance section of the van can also be used to control the hydraulic lift through the hydraulic pump in the cab portion, if desired.

Figure 7:
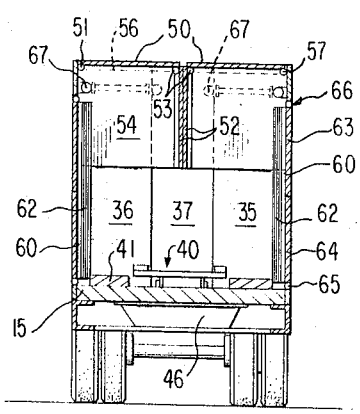
FIG. 7 is a cross-sectional view taken substantially along line 7—7 of FIG. 3.

Top wall portion 14, which forms the roof of the van in the area overlying the hydraulic lift 40, is provided with an opening of the order of twenty-five feet in length, and substantially the width of the vehicle, closed by a pair of cooperating panels 50, hinged at 51, along opposite longitudinal edges to the edge of top wall portion 14 at its juncture with side wall portions 11 and 12 as shown more specifically in FIGS. 7 and 8. An auxiliary pair of longitudinal roof panels 52 are hinged at 53 to the opposite terminating edges of cooperating roof panels 50, so as to extend downwardly into the vehicle, as shown in FIG. 7, when the roof panels 50 are disposed in the plane of the roof to close the opening during transportation. When the mobile service station unit arrives at its servicing site, since the roof panels 50 and 52 are constructed of lightweight material as they serve only as coverings and not as rigid structural elements, due to their lightness in weight only two men are required to raise the roof section to increase the height of the vehicle as shown in FIGS. 2, 4 and 8. Roof sections 50 are pivoted about hinges 51 to the vertical position and roof sections 52 are held in the horizontal position with their free ends abutting each other, as shown in FIG. 8. Front and rear roof panels 54 and 55, laterally hinged at 56 and 57, respectively to the top wall portion 14, are then raised to a vertical position to abut the inner sides of roof panels 50 and support the under sides of auxiliary roof panels 52, at their ends, to maintain the same in the raised position. As shown in FIG. 8, a yoke-shaped, spring-loaded lock 58 actuated by a pull cord 59 or the like is carried adjacent the free ends of front and rear roof panels 54 and 55, and is adapted to engage apertures adjacent the free ends of auxiliary roof panels 52 in the raised position to lock all of the roof panels to each other in the raised positions. When the roof panels are lowered, pull cords 59 are pulled at opposite ends of the raised roof section to disengage locks 58 so that the front and rear roof panels 54 and 55 can be pivoted downwardly into the vehicle as shown in FIGS. 3 and 7, after which the remaining roof sections are folded into the vehicle as previously described, so that the cooperating roof panels 50 again fold into the plane of top wall portion 14 to form a roof over the area of the hydraulic lift.

Roof panels 50, 52, 54 and 55 are approximately four feet in width so as to add an additional four feet in height to the van body portion over the hydraulic lift area to enable the hydraulic lift to raise an automobile at least six feet in the air to provide sufficient space beneath the car for maintenance and still maintain the car completely covered as if it were in a stationary shop, thus enabling automobiles to be worked on during any type of weather. This necessary cooperation between the hydraulic lift and raised roof section provides the necessary maintenance space beneath the automobile.

The van body portion is sufficiently long to enable mechanics sufficient working room in front of the automobile, but it is necessary to provide additional side working space to enable mechanics to change tires, grease and replace wheel bearings, etc. To provide this space an opening of approximately twenty feet in length is provided along each side wall portion 11 and 12 of the van in the area of hydraulic lift. A pair of door sections 60 are vertically hinged at 61 interior of the van so as to be disposed inside the van when in its closed transport position as shown in FIG. 7. A pair of collapsible folding doors 62 are secured to the free vertical interior edge of the door sections 60 so as to extend interior of the van during transportation. A pair of cooperating side door sections 63 and 64 are hinged along their upper and lower edges, respectively, at 65 and 66 to the top and bottom edges of the side wall opening in the van, with the free ends of the doors lying in close relation to close the opening during transportation as shown in FIGS. 1, 3, 5 and 7. In the closed position, side door sections 63 and 64 are disposed flush with side wall portions 11 and 12. Side door sections 64 are counterbalanced by conventional means, not shown, similar to the tailgate of a station wagon, so that when they are folded outwardly and downwardly they will remain in a horizontal position as indicated in FIG. 8. Side door sections 63 are then raised upwardly and door sections 60 are swung outwardly to support the ends of side door section 63 and maintain it in the raised position. Collapsible folding doors 62 are then drawn inwardly toward each other and fastened together to form a back wall for the extended side portion of the vehicle. With the side door sections 63 and 64 on opposite sides of the vehicle extended in this manner with each providing approximately three and a half feet of additional working space on opposite sides of the hydraulic lift area, the overall width of the van body portion in this area is increased by approximately seven feet to provide sufficient working space to allow mechanics to perform any desired type of maintenance on an automobile.

In lieu of collapsible folding doors 62 a plurality of door panels constructed of thin corrugated material may be vertically hinged to each other and to door sections 60 so as to fold back upon each other in overlying relation when in the folded position. When door sections 60 are swung to their extended position, as shown in FIG. 2, the corrugated door panels can be unfolded to form a back wall for the side extended portions in the same manner as the folding doors 62. Another arrangement would be to have two additional side door sections hingedly connected to the lower free end of top side door section 63 so that when door section 63 is swung upwardly to form the roof of the side extended section, the two additional thin corrugated side door sections hinged thereto can be folded downwardly to close in the back of the extended section. These thin corrugated doors would extend downwardly to meet side door section 64 and would be used in lieu of additional door sections such as shown at 62 connected to the vertically hinged door sections 60.

Referring to the schematic block diagram of FIG. 9, as previously indicated, motor generator unit 8 supplies electrical power for driving gas pump 9 and air compressor 10 on cab platform 7. In addition, this unit also supplies electrical power to the fluorescent lights shown at 67 in FIGS. 5, 7 and 8 for lighting walkway 37 and the van body portion in the maintenance area of hydraulic lift 40. The generator unit also supplies power to an appropriate number of electrical outlets 68, shown in FIG. 5, used for operating power tools, portable trouble-lamps, and the like. The power supplied to van body portion 1 is also used to operate electric heaters during the winter months and a battery charger 39 in storage compartment 36. The air compressor 10 in addition to supplying an outlet hose 69 at the compressor unit, for servicing automobile tires, also supplies a compressed air outlet 70 at an appropriate location in the maintenance area of the van body portion. This compressed air outlet 70 is utilized for servicing automobile tires within the van body portion, and is also used for actuating a compressed air-driven grease gun when performing lubricating service on an automobile. The hose supplying compressed air to outlet 70 as well as the electrical power supply line may be disposed within one of the side walls 11 or 12 of the van.

While the invention has been described in certain preferred embodiments, it is realized that modifications may be made without departing from the spirit of the invention, and it is to be understood that no limitations upon the invention are intended other than those imposed by the scope of the appended claims.

What we claim as new and desire to secure by Letters Patent of the United States, is as follows:

1. A mobile wheeled service unit for vehicles comprising: a transportable base structure of sufficient size to at least receive a vehicle, a top wall portion, side wall portions connected to support said top wall portion in spaced relation above said base structure, a vehicle entrance ramp connected to one end of said base structure, vehicle lift means connected to said base structure interior of said service unit, and movable roof panel means movable into open and closed positions connected to said top wall portion above said vehicle lift means, whereby upon opening said movable roof panel means a vehicle may be raised on said lift means for service in said service unit.

2. A mobile wheeled service unit as set forth in claim 1 in which said movable roof panel means comprise cooperating first roof sections adapted to close and open an opening in said top wall portion, and hinge means connecting opposite longitudinal edges of said first roof sections to said top wall portion.

3. A mobile wheeled service unit as set forth in claim 2 and cooperating second roof sections, second hinge means connecting opposite longitudinal edges of said second roof sections to the free longitudinal edges of said first roof sections, whereby when moved to the open position said first roof sections are vertically disposed and said second roof sections are horizontally disposed.

4. A mobile wheeled service unit as set forth in claim 2 including third roof sections, and third hinge means connecting said third roof sections laterally of said top wall portion at opposite ends of said first roof sections.

5. A mobile wheeled service unit as set forth in claim 4 in which said third roof sections are movable to an open position between said first roof sections to support the latter in the open position.

6. A mobile wheeled service unit as set forth in claim 3 including third roof sections movable to an open position, and third hinge means connecting said third roof sections laterally of said top wall portion at opposite ends of said first roof sections to support said first and second roof sections in open position.

7. A mobile wheeled service unit as set forth in claim 6, and lock means connecting said first, second and third roof sections in the open position.

8. A portable wheeled van service unit for automobiles and the like comprising, an elongated transportable base structure, automobile lift means connected to said base structure and adapted to be selectively raised above said base structure, side wall portions connected to said base structure, a top wall portion supported above said base structure by said side wall portions, and means movable to a raised position connected to open a portion of said top wall portion above said automobile lift means, whereby an automobile may be raised on said lift means through the open portion of said top wall portion for service therebeneath.

9. A portable wheeled van service unit as set forth in claim 8, in which said automobile lift means is connected in a recess in said base structure.

10. A portable wheeled van service unit as set forth in claim 8, including elongated recessed drain means connected to said base structure and said automobile lift means connected in said elongated recessed drain means.

11. A portable wheeled van service unit as set forth in claim 8, including partition means extending laterally of said base structure, top wall and side wall portions at one end of said elongated transportable base structure, and fuel storage means connected between said partition means.

12. A portable wheeled van service unit as set forth in claim 8, including fuel storage means connected at one end of said elongated base structure between said side wall portions, and storage means connected to said base structure between said fuel storage means and said automobile lift means.

13. A portable wheeled service unit for vehicles comprising a powered cab portion, an elongated transportable enclosed van body portion, connected to said cab portion, fuel pump means connected to said cab portion, fuel supply compartment means connected in the forward portion of said van body portion adjacent the connection of said van body portion to said cab portion, said fuel supply compartment means connected to supply fuel to said fuel pump means, vehicle lift means connected in said van body portion rearwardly of said fuel supply compartment means, ramp means connected to the end of said van body portion adjacent said vehicle lift means whereby a vehicle may be driven up the ramp means onto said vehicle lift means in said van body portion, a roof portion included in said van body portion, and roof section means movable to a raised position connected to open a portion of said roof portion above said vehicle lift means, said vehicle lift means being movable to a raised position to raise a vehicle thereon through the open portion of said roof portion.

14. A portable wheeled service unit for vehicle as set forth in claim 13 in which said fuel pump means is connected on said cab portion forwardly of the connection of said cab portion to said elongated enclosed van body portion.

15. A portable wheeled service unit for vehicles as set forth in claim 13, including storage compartment means connected interior of said enclosed van body portion between said fuel supply compartment means and said vehicle lift means.

16. A portable wheeled service unit for vehicles as set forth in claim 13, said enclosed elongated van body portion including side walls, and side wall section means movable to open and close said side walls adjacent said vehicle lift means to provide additional working space within said van body portion about said vehicle lift means.

17. A portable wheeled van service unit as set forth in claim 8, including side wall section means movable into open and closed positions connected to open said side wall portions adjacent said automobile lift means to increase the working area of said base structure about said automobile lift means.

References Cited by the Examiner

UNITED STATES PATENTS

| | | |
|---|---|---|
| 1,989,940 | 2/1935 | McGaughan et al. _ 137—234.6 X |
| 2,765,938 | 10/1956 | Di Addezio _____ 137—234.6 X |

WILLIAM F. O'DEA, *Primary Examiner.*

D. H. LAMBERT, *Assistant Examiner.*